(12) United States Patent
Rubens et al.

(10) Patent No.: US 10,363,609 B2
(45) Date of Patent: Jul. 30, 2019

(54) SELF-TIGHTENING ROTARY TOOL HOLDING SYSTEM

(71) Applicants: Robert Bosch Tool Corporation, Broadview, IL (US); Robert Bosch GmbH, Stuttgart (DE)

(72) Inventors: Jeremy Rubens, Palatine, IL (US); Chris Dvorak, Chicago, IL (US)

(73) Assignees: Robert Bosch Tool Corporation, Broadview, IL (US); Robert Bosch GmbH, Stuttgart (DE)

(*) Notice: Subject to any disclaimer, the term of this patent is extended or adjusted under 35 U.S.C. 154(b) by 56 days.

(21) Appl. No.: 15/479,587

(22) Filed: Apr. 5, 2017

(65) Prior Publication Data

US 2017/0203373 A1 Jul. 20, 2017

Related U.S. Application Data

(62) Division of application No. 14/207,781, filed on Mar. 13, 2014, now abandoned.

(Continued)

(51) Int. Cl.
*B23B 31/12* (2006.01)
*B23B 31/26* (2006.01)
(Continued)

(52) U.S. Cl.
CPC .......... *B23B 31/26* (2013.01); *B23B 31/1173* (2013.01); *B23B 31/14* (2013.01);
(Continued)

(58) Field of Classification Search
CPC ....... B23B 31/14; B23B 31/201; B23B 31/18; B23B 31/223; B23B 31/1173;
(Continued)

(56) References Cited

U.S. PATENT DOCUMENTS 209,486 A 10/1878 Luther
1,392,705 A * 10/1921 Rhodes .................. B23G 5/106
279/36

(Continued)

FOREIGN PATENT DOCUMENTS

EP 0078619 A2 5/1983
EP 0987075 A2 3/2000

OTHER PUBLICATIONS

International Search Report and Written Opinion corresponding to PCT Application No. PCT/US2014/026555, dated Aug. 29, 2014 (16 pages).

*Primary Examiner* — Sunil K Singh
*Assistant Examiner* — Paul M Janeski
(74) *Attorney, Agent, or Firm* — Maginot Moore & Beck LLP

(57) ABSTRACT

A tool holding system for a rotary power tool is configured to clamp around a working tool when the working tool is inserted in the tool holding system. The tool holding system includes a sleeve having a frustroconical inner surface portion, a collet having frustoconical outer surface portion complementary to the inner surface portion, a spring mount operably connected to a motor for rotation by the motor, and a spring. The spring includes a first end portion operably connected to the collet to bias the collet toward a first position whereat the outer surface portion engages the inner surface portion, and a second end portion rotationally fixed with respect to the spring mount.

7 Claims, 8 Drawing Sheets

Related U.S. Application Data

(60) Provisional application No. 61/789,214, filed on Mar. 15, 2013.

(51) Int. Cl.
*B23B 31/14* (2006.01)
*B23B 31/117* (2006.01)
*B23B 31/18* (2006.01)
*B23B 31/20* (2006.01)
*B23B 31/22* (2006.01)

(52) U.S. Cl.
CPC ............ *B23B 31/18* (2013.01); *B23B 31/201* (2013.01); *B23B 31/207* (2013.01); *B23B 31/223* (2013.01); *B23B 2231/06* (2013.01); *Y10T 279/17* (2015.01); *Y10T 279/17179* (2015.01); *Y10T 279/17196* (2015.01)

(58) Field of Classification Search
CPC ..... Y10T 279/17179; Y10T 279/17196; Y10T 279/17
USPC ........................................ 279/71–72, 107, 36
See application file for complete search history.

(56) References Cited

U.S. PATENT DOCUMENTS

| | | | |
|---|---|---|---|
| 1,634,422 A * | 7/1927 | Holmes | E04G 17/075 24/136 R |
| 1,846,382 A * | 2/1932 | Bing | F16M 11/041 248/187.1 |
| 1,865,012 A * | 6/1932 | Jackson | E04F 21/12 15/418 |
| 2,012,280 A * | 8/1935 | Johansen | E21B 3/04 175/414 |
| 2,081,142 A * | 5/1937 | Branaman, Sr. | G04D 3/086 134/109 |
| 2,610,065 A | 9/1952 | Banker | |
| 2,670,215 A * | 2/1954 | Fishwick | B23B 31/1253 279/36 |
| 3,521,895 A | 7/1970 | Smith | |
| 5,464,229 A | 11/1995 | Salpaka | |
| 5,826,888 A | 10/1998 | Weaver et al. | |
| 2004/0021276 A1 | 2/2004 | Allan et al. | |
| 2006/0017239 A1 | 1/2006 | Hartmann et al. | |
| 2010/0176562 A1 | 7/2010 | Linzell | |
| 2010/0301569 A1 | 12/2010 | Rohr, Jr. | |

\* cited by examiner

SELF-TIGHTENING ROTARY TOOL HOLDING SYSTEM

CLAIM OF PRIORITY

This application is a divisional application of co-pending U.S. application Ser. No. 14/207,781 filed Mar. 13, 2014, which claims priority to U.S. Provisional Application Ser. No. 61/789,214 entitled "Self-Tightening Rotary Tool Holder" by Rubens et al., filed Mar. 15, 2013, the disclosures of which are hereby incorporated herein by reference in their entirety.

TECHNICAL FIELD

This disclosure relates generally to power tools, and, more particularly, to tool holders for power tools.

BACKGROUND

In general, rotary tools and oscillating tools are lightweight, handheld power tools capable of being equipped with a variety of tool accessories and attachments, such as cutting blades, sanding discs, grinding tools, and many others. These types of tools, referred to hereinafter as power tools, typically include a generally cylindrically-shaped main body that serves as an enclosure for an electric motor as well as a hand grip for the tool. The electric motor is operably coupled to a drive member, referred to herein as a tool holder, that extends from a portion of the main body of the power tool. The electric motor is configured to rotate and/or longitudinally oscillate the tool holder at relatively high frequencies. The tool holder in turn is configured to secure different accessory tools so that as the tool holder is driven to move by the electric motor, an accessory tool secured to the holder is driven to perform work on a workpiece.

The accessory tools are typically secured in the tool holder by a clamping mechanism to prevent slipping of the tool and loss of power to the tool. The load applied to the clamping mechanism must be amplified in order to generate enough clamping load to the accessory to secure the tool in the tool holder. Typically this load amplification is achieved through the use of wrenches that allow the user to apply torque to generate a large amount of clamping force that clamps the tool in the tool holder. In some instances, however, the wrench can become separated from the tool or the user may be unable to generate sufficient clamping force even with the wrench. Furthermore, wrench clamping systems increase the size of the tool holder, as the tool holder must have an interface to engage the wrench. It would be beneficial, therefore, to provide improvements to tool holders that simplify clamping of the tool therein.

SUMMARY

In one embodiment, a rotary power tool includes a tool holding system configured to self-tighten around a shank of a working tool inserted in the rotary power tool. The rotary power tool comprises a sleeve including a frustroconical inner surface portion, a collet including frustoconical outer surface portion complementary to the inner surface portion, a spring mount operably connected to a motor for rotation by the motor, and a spring. The spring includes a first end portion operably connected to the collet to bias the collet toward a first position whereat the outer surface portion engages the inner surface portion, and a second end portion rotationally fixed with respect to the spring mount.

In another embodiment, a tool holding system is configured to self-tighten around a shank of a working tool inserted in the tool holding system. The tool holding system comprises a first cage member, a plurality of roller members, and a roller carriage. The first cage member includes a first plurality of elongated slots, each of the first plurality of elongated slots having a first end portion which opens to a first shank receiving opening defined by the first cage member, and a second end portion which does not open to the first shank receiving opening. Each roller member of the plurality of roller members is movably positioned in a respective one of the first plurality of elongated slots. The roller carriage includes a carriage opening aligned with the first shank receiving opening, and a plurality of generally cylindrical passages. Each of the plurality of generally cylindrical passages (i) is substantially parallel to the central axis, (ii) receives a portion of a respective one of the plurality of roller members, and (iii) is configured to prevent the respective roller member from moving circumferentially relative to the roller carriage while permitting the respective roller member to move radially relative to the roller carriage within a predetermined range.

In yet another embodiment, a rotary power tool includes a tool holding system configured to self-tighten around a shank of a working tool inserted in the rotary power tool. The rotary power tool comprises a first one-way clutch rotationally fixed with respect to an output shaft of a rotary power tool and defining a first shank receiving opening. The rotary power tool further comprises an alignment assembly including a second shank receiving opening aligned with the first shank receiving opening. The alignment assembly is configured to align a shank of a working tool received within the first shank receiving opening and the second shank receiving opening, and to generate a damping force on the received shank.

In a further embodiment, a rotary power tool includes a tool holding system configured to self-tighten around a shank of a working tool inserted in the rotary power tool. The rotary power tool comprises a first collar rotationally fixed with respect to an output shaft of a power tool and including a first shank receiving opening having a longitudinal axis, a second collar movable with respect to the output shaft and including at least one inclined outer surface, and at least one lever pivotably connected to the first collar. The at least one lever includes a first end portion configured to engage the at least one inclined outer surface, and a cam located at a second end portion. The cam extends into the first shank receiving opening such that upon rotation of the output shaft in a first rotational direction, the at least one inclined outer surface is forced against the first end portion thereby forcing the cam toward the axis.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

As used herein, any references to "clockwise" and "counter-clockwise" directions refer to clockwise and counter-clockwise directions as viewed looking toward the power tool, into the tool holder.

Figure 1:
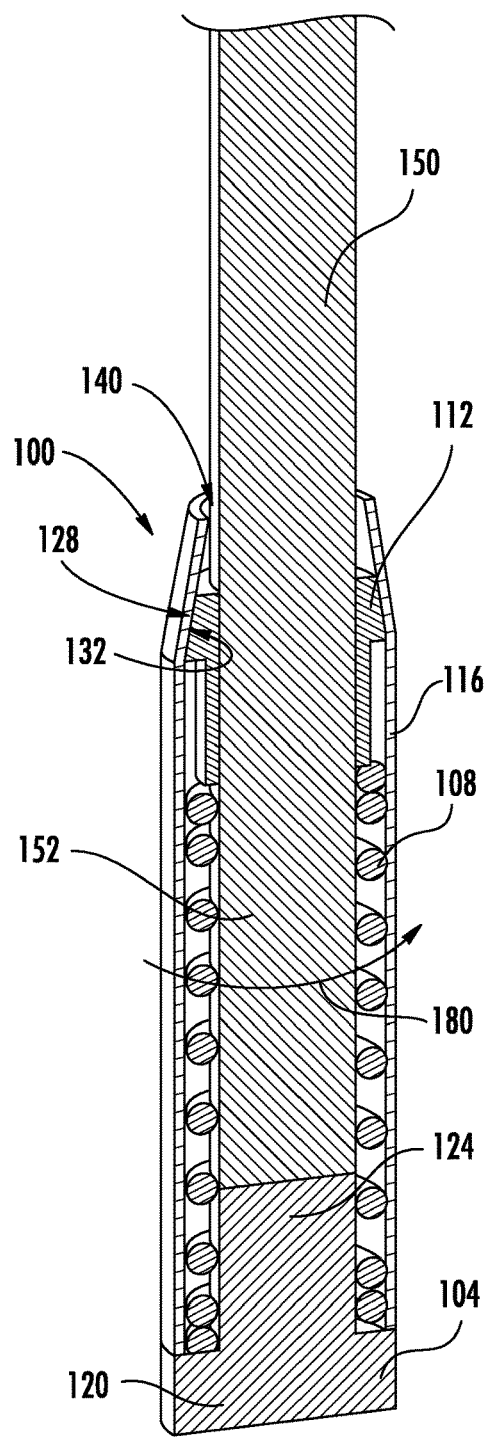
FIG. 1 is a cross-sectional schematic view of a self-tightening tool holder having a spring for clamping a tool in the tool holder.
Figure 2A:
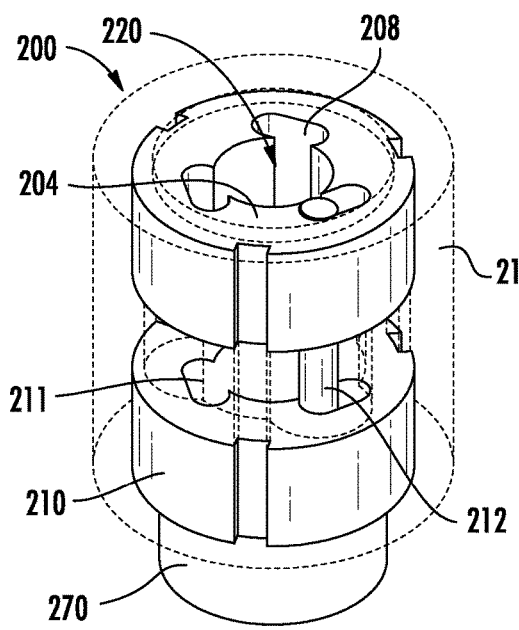
FIG. 2A is a side perspective view of a self-tightening tool holder having roller grooves for clamping a tool in the tool holder.
Figure 2B:
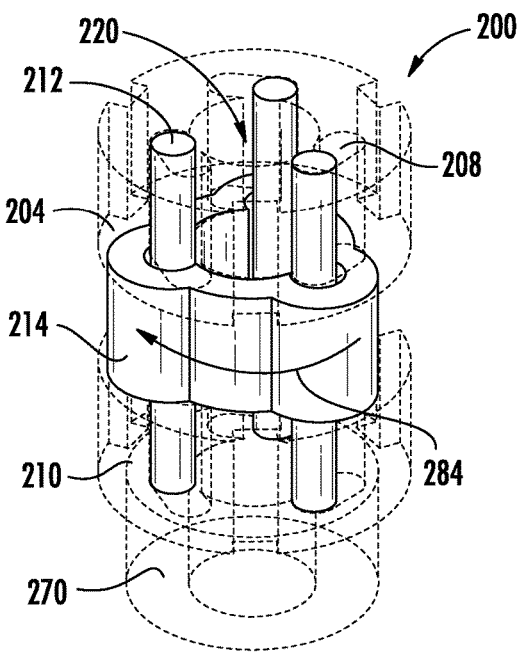
FIG. 2B is a side perspective view of the self-tightening tool holder of FIG. 2A showing the roller carriage.
Figure 2C:
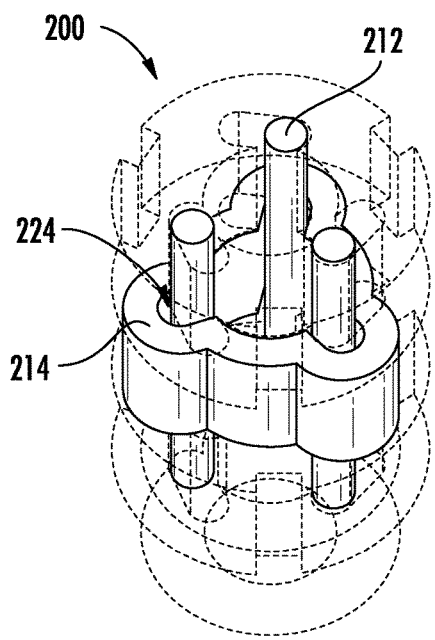
FIG. 2C is a side perspective view of the self-tightening tool holder of FIG. 2A with the roller cage shown in outline to better illustrate the roller carriage.
Figure 3:
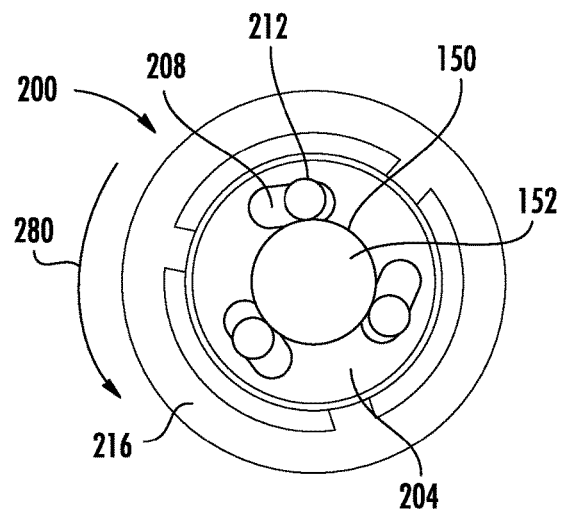
FIG. 3 is a top view of the self-tightening tool holder of FIG. 2A clamped around the tool.

FIG. 1 depicts a self-tightening tool holder 100 for a rotary power tool. The tool holder 100 includes a spring mount 104, a spring 108, a collet 112, and a housing 116. The spring mount 104 is operatively connected to and rotationally fixed with an output shaft of a power tool. The spring mount 104 includes an outwardly extending flange 120 and a cylindrical extension 124 projecting axially into the housing. The spring 108 is positioned within the housing with an axially inner end fixed to the flange 120 of the spring mount 104. The spring 108 wraps around the cylindrical extension 124 within the housing 116, extending axially in the housing 116 such that an axially outer end of the spring 108 contacts the collet 112. In the embodiment of FIG. 1, the spring 108 is referred to as a "left-wound" spring, by which is meant counter-clockwise rotation of the spring 108 with respect to the axially fixed inner end narrows the inner diameter of the spring 108. The collet 112 includes an angled outer frustoconical surface 128 that is urged into contact with an inner frustoconical surface 132 of the housing 116 by the axial force exerted by the spring 108. The housing 116 further includes a circular opening 140 in an outer end of the housing 116.

In operation, a shank 152 of a working tool 150 is inserted in the circular opening 140 of the housing 116. The working tool 150 pushes the collet downwardly in the view of FIG. 1, compressing the spring 108 and enabling the collet 112 to open as the frustoconical surface 128 of the collet 112 slides down the frustoconical surface 132 of the housing 116. Once the collet 112 has been pushed down the housing 116 far enough for the working tool 150 to fit through the center of the collet 112, the working tool 150 is pushed downwardly in the tool holder 100 until an end of the shank 152 contacts the cylindrical extension 124 of the spring mount 104. The spring 108 then urges the collet 112 toward the central opening 140, pushing the collet 112 radially inwardly due to the engagement of the frustoconical surfaces 128 and 132. The collet 112 tightens around the shank 152 and centers the working tool 150 radially within the tool holder 100.

The power tool is then activated, rotating the spring mount 104 in the counter-clockwise direction 180. In response to the torque generated by the power tool, the spring 108 is twisted in the direction of the spring winding, reducing the inner diameter of the spring 108. As the inner diameter of the spring 108 decreases, the inner surfaces of the spring windings clamp around the shank 152, increasing the clamping force on the shank 152. As the rotational velocity of the tool holder 100 increases and the working tool 150 begins to perform work on the workpiece, the angular velocity of the working tool 150 decreases with respect to the angular velocity of the spring mount 104. The shank 152 slips within the tool holder 100, generating additional torque on the axially outer end of the spring 108 and further reducing the inner diameter of the spring 108. The further reduced inner diameter of the spring 108 clamps the shank 152 tighter in the tool holder 100, stopping the shank 152 from slipping further and retaining the working tool 150 in the tool holder 100.

To remove the working tool 150 from the tool holder 100, the working tool 150 is twisted relative to the tool holder 100 in a direction opposite direction 180. As the working tool 150 is twisted relative to the tool holder 100, the reverse torque results in the inner diameter of the spring 108 increasing. The clamping force generated by the spring 108 therefore decreases, enabling user to remove the working tool 150 from the tool holder 100.

Another self-tightening tool holder 200 is illustrated in FIGS. 2A-2C and 3. The tool holder 200 includes an outer roller cage 204 having a plurality of elongated slots 208, an inner roller cage 210 having a plurality of elongated slots 211, a plurality of rollers 212, each of which is positioned within one of the slots 208 and one of the slots 211, a roller carriage 214, and a housing 216. The roller cages 204 and 210 are hollow and substantially cylindrical, and the roller cages 204 and 210 define a substantially cylindrical shank receiving opening 220 extending longitudinally through the center of the roller cages 204 and 210. The inner roller cage 210 is operatively connected to and configured to rotate with an output shaft 270 of the power tool to which the tool holder 200 is attached. The housing 216 is substantially cylindrical and surrounds the roller cages 204 and 210. The housing 216 is fixedly attached to the roller cages 204 and 210 by locking projections 224 such that the housing 216 and the roller cages 204 and 210 rotate together.

The elongated slots 208 extend axially at least partially through the outer roller cage 204 parallel to a central axis of the outer roller cage 204. Each elongated slot 208 is oriented lengthwise such that a first end portion of the elongated slot 208 is radially closer to the central axis than a second end portion of the elongated slot 208. In the illustrated embodiment, the clockwise end of each elongated slot 208 is radially closer to the central axis of the outer roller cage 204 than the counterclockwise end, though in other embodiments the counterclockwise end of the slot is closer to the central axis. The elongated slots 208 open at the first end portion to the shank receiving opening 220, such that the rollers 212 extend partially into the shank receiving opening 220 in the absence of a shank 152 being positioned in the shank receiving opening 220. The second end portions of the elongated slots 208 do not open to the shank receiving opening 220. Although the illustrated embodiment includes three rollers and three slots, other embodiments have more than three rollers and slots. The slots 211 of the inner roller cage 210 are configured substantially the same as the slots 208 of the outer roller cage 204, such that the slots 211 are radially closer to the central axis of the inner roller cage 210 at the clockwise end of each slot 211, and the slots 211 open at a first end to the shank receiving opening 220, but do not open to the shank receiving opening at the second end.

The roller carriage 214 is positioned within the housing 216 between the inner roller cage 204 and the outer roller cage 210. The roller carriage 214 substantially surrounds the central opening 220 and includes three generally cylindrical passages 224 that open to the shank receiving opening 220. The generally cylindrical passages 224 are configured to accommodate the rollers 212 and guide the rollers 212, enabling movement of the rollers 212 with respect to the roller carriage 214 only in the radial direction while preventing relative movement of the rollers 212 in the circumferential direction. A spring (not shown) or other biasing mechanism urges the roller carriage 214 in the clockwise direction 284 to push the rollers 212 into the shank receiving opening 220.

In operation, a shank 152 of a working tool 150 is inserted into the shank receiving opening 220, pushing the rollers 212 counterclockwise within the slots 208 and 211 as the shank 152 is introduced into the shank receiving opening 220. In one embodiment, the user turns the roller carriage in the counterclockwise direction to move the rollers out of the shank receiving opening and facilitate insertion of the tool. The spring or other biasing mechanism twists the roller carriage 214 in direction 284 and the passages 224 in the roller carriage 214 urge the rollers 212 in direction 284 within the elongated slots 208 and 211. The elongated slots 208 and 211 guide the rollers 212 radially inwardly into contact with the shank 152 to clamp the shank 152 in the tool holder 200. The roller carriage 214 also ensures that the rollers 212 remain equally spaced around the circumference of the shank 152 to facilitate centering of the working tool 150 within the tool holder 200.

The power tool in which the tool holder 100 is installed is then activated, turning the output shaft 270 of the power tool, the inner roller cage 210, the housing 216, and the outer roller cage 204 in clockwise direction 280. As the roller cages 204 and 210 rotate in direction 280, the initial torque generated by the rotation results in the roller cages 204 and 210 rotating faster than the rollers 212, which then slide toward the clockwise end of the elongated slots 208 and 211. As the rollers 212 move within the elongated slots 208 and 211, the rollers 212 press further into the shank 152, increasing the clamping force exerted by the rollers 212 on the shank 152.

Once the working tool 150 begins to perform work on the workpiece, the angular velocity of the working tool 150 is reduced with respect to the angular velocity of the roller cages 204 and 210 by friction of the working tool 150 acting on the workpiece. The roller cages 204 and 210, which are rotationally fixed to the output shaft 270, thus rotate in direction 280 faster than the shank 152. The frictional contact of the working tool 150 and the rollers 212 and the differential velocities of the shank 152 and the roller cages 204 and 210 result in the rollers 212 sliding or rolling within the slots 208 and 211 toward the clockwise end of the elongated slots 208 and 211, pressing the rollers 212 tighter into the shank 152. The increased pressure exerted by the rollers 212 on the shank 152 clamps the working tool 150 tighter in the shank receiving opening 220 such that the shank 152 no longer slips with respect to the tool holder 200 as the tool holder 200 rotates.

To remove the working tool 150, the user turns the housing 216 in a clockwise direction, resulting in the elongated slots 208 and 211 sliding around the rollers 212 such that the rollers 212 move toward the counterclockwise end of the elongated slots 208 and 211. In some embodiments, the tool holder is configured such that the user rotates the roller carriage in the counterclockwise direction with respect to the roller cages, forcing the rollers toward the counterclockwise end of the slots in the inner and outer roller cages due to the engagement of the passages in the roller carriage with the rollers. The rollers 212 move radially outwardly, away from the shank 152, as the rollers 212 move toward the counterclockwise end of the elongated slots 208 and 211 and, as a result, no longer generate the clamping force on the working tool 150. The user then removes the working tool 150 from the central opening 220 of the tool holder 200 without resistance.

Figure 4:
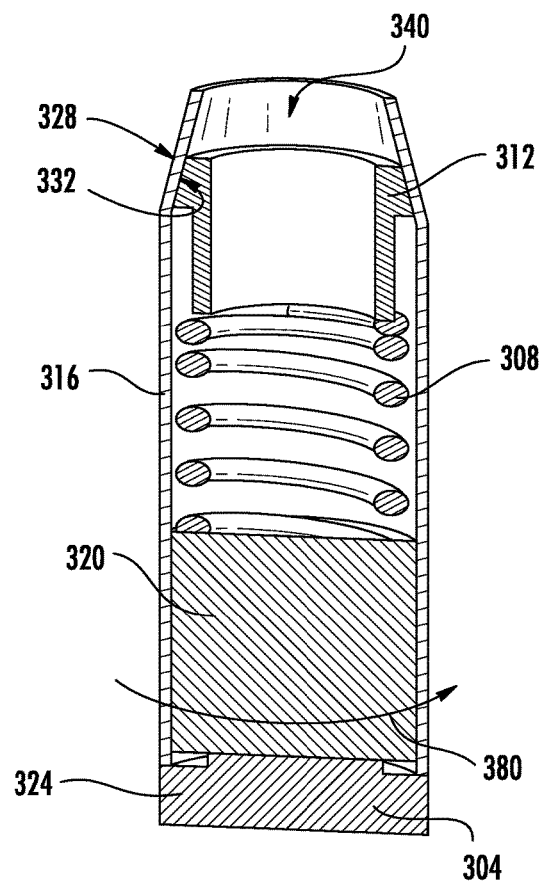
FIG. 4 is a cross-sectional schematic view of a self-tightening tool holder having a one-way clutch for clamping a tool in the tool holder.

FIG. 4 illustrates another self-tightening tool holder 300 for a rotary power tool. The tool holder 100 includes a mount 304, a spring 308, a collet 312, a housing 316, and a one-way clutch 320. The mount 304 is operatively connected to and configured to rotate with an output shaft of a power tool in direction 380. The mount 304 includes an outwardly extending flange 324. The one-way clutch 320 is positioned within the housing interposed between the mount 304 and the spring 308. The spring 308 is positioned within the housing 316, braced against the one-way clutch 320 and the collet 312 to urge the collet 312 in an axially outer direction. The collet 312 includes an outer frustoconical surface 328 that is urged into contact with an inner frustoconical surface 332 of the housing 316 by the spring 308. The housing 316 defines a central shank receiving opening 340 at an outer end of the housing 316 and extending through the center of the housing 316, spring 308, and collet 312.

Figure 5A:
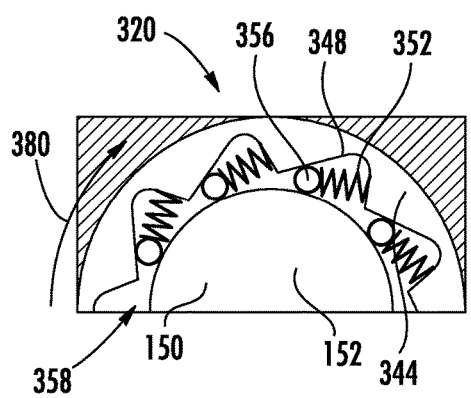
FIG. 5A is a schematic view of the one-way clutch of the self-tightening tool holder of FIG. 4 in a locked state.
Figure 5B:
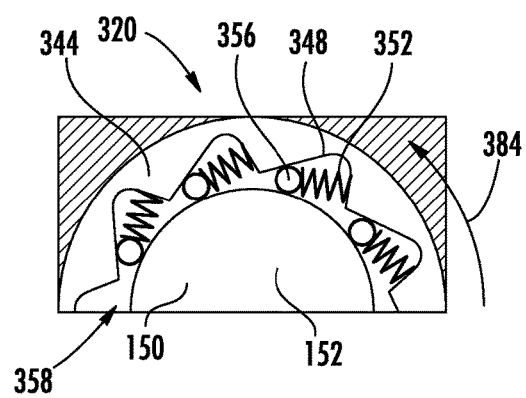
FIG. 5B is a schematic view of the one-way clutch of the self-tightening tool holder of FIG. 4 in an unlocked state.

The one-way clutch 320 is shown in detail in FIGS. 5A and 5B. The one-way clutch includes an outer ring 344 including a plurality of indentations 348. A biasing member 352 is connected at one end to the outer ring 344 within each of the indentations 348, and a roller 356 is attached to the other end of each biasing member 352. The biasing members 352 are configured to urge the rollers 356 into contact with a shank 152 of a working tool 150 extending centrally through an inner bore 358 of the one-way clutch 320. In the illustrated embodiment, the biasing members are helical coil springs, though other biasing members are used in different embodiments.

In operation, a working tool 150 is inserted into the central opening 340 of the tool holder 300, pushing the collet 312 downwardly in the view of FIG. 4 to compress the spring 308. The collet 312 opens as the frustoconical surface 328 of the collet 312 slides down the frustoconical surface 332 of the housing 316. Once the collet 312 has been pushed down the housing 316 far enough for the working tool 150 to fit through the center of the collet 312, the working tool 150 is pushed downwardly in the tool holder 300 until the shank 152 of the working tool 150 enters the one-way clutch 320. The spring 308 urges the collet 312 toward the central opening 340, which pushes the collet 312 radially inwardly due to the engagement of the frustoconical surfaces 328 and 332. The collet 312 tightens around the working tool 150 and centrally aligns the working tool 150 radially within the tool holder 300. Additionally, clamping force the collet 312 exerts on the outer surface of the bit 150 generates a frictional damping force to disable the shank 152 from slipping within the clutch 320 due to dynamic locking and unlocking of the one-way clutch 320.

The motor of the rotary power tool is then activated to rotate the mount 304, housing 316, and one-way clutch 320 in direction 380 (FIG. 5A). As the one-way clutch 320 rotates in direction 380, the rotation of the outer ring 344 of the one-way clutch 320 wedges the rollers 356 between the walls of the indentations 348 and the shank 152. Thus, as the outer ring 344 rotates in direction 380, an axially inwardly-acting clamping force is generated by the rollers 356 to clamp the shank 152 securely in the tool holder 300 such that the working tool 150 rotates with the tool holder 300.

To release the working tool 150 from the tool holder 300, the user turns the housing 316 in a direction opposite direction 380, turning the one-way clutch 320 in direction 384 (FIG. 5B). As the outer ring 344 of the clutch 320 turns in direction 384, the rollers 356 move with the shank 152, against the force generated by the biasing members 352. As shown in FIG. 5B, the rollers 356 move out of contact with the walls of the indentations 348 and, as a result, no longer generate a clamping force holding the working tool 150 in place. The user then removes the working tool 150 from the tool holder 300 without resistance.

Figure 6:
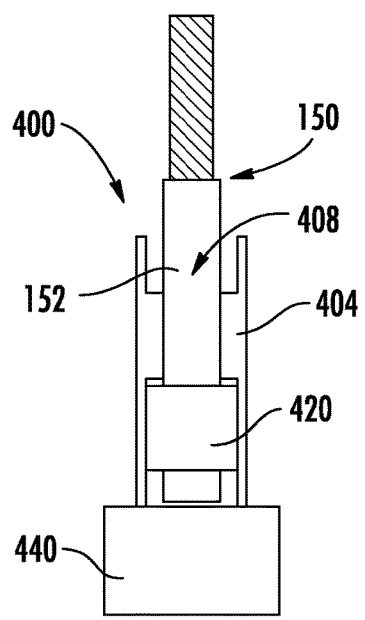
FIG. 6 is a schematic view of a self-tightening tool holder having a one-way clutch and an alignment ring for clamping and centering a tool in the tool holder.

Another self-tightening tool holder 400 is illustrated in FIG. 6. The tool holder 400 includes a one-way clutch 420 and an alignment ring 404. The one-way clutch 420 is substantially the same as the one-way clutch 320 described with reference to FIGS. 5A and 5B. The alignment ring 404 surrounds the one-way clutch 420 and includes a central shank receiving opening 408. In one embodiment, the alignment ring 404 is formed of rubber, though other materials are used in other embodiments. The one-way clutch 420 and alignment ring 404 are configured to rotate with an output shaft 440 of the rotary power tool.

In operation, a working tool 150 is inserted through the shank receiving opening 408 of the alignment ring 404, into the one-way clutch 420. The alignment ring 404 centers the working tool 150 axially within the tool holder 400. The alignment ring 404 additionally generates a damping force on the working tool 150 that disables the working tool 150 from slipping within the one-way clutch 420 due to dynamic locking and unlocking of the one-way clutch 420. The user then activates the rotary power tool and, as the output shaft 440 rotates, the one-way clutch 420 operates in the same manner as the one-way clutch 320 described above with reference to FIGS. 5A and 5B to securely clamp the shank 152 within the tool holder 400. In addition, once the rotary power tool is activated, the clamping force generated by the one-way clutch 420 supplements the alignment function provided by the alignment ring 404 to retain the working tool 150 centered within the tool holder 400.

Figure 7:
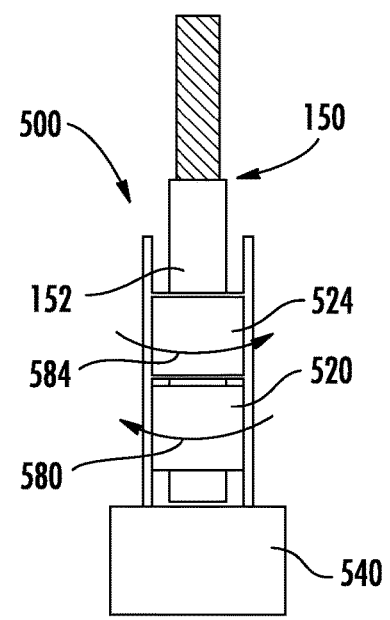
FIG. 7 is a schematic view of a self-tightening tool holder having two one-way clutches for clamping a tool in the tool holder.

FIG. 7 illustrates another embodiment of a self-tightening tool holder 500. The tool holder 500 includes a first one-way clutch 520 and a second one-way clutch 524. The first one-way clutch 520 is configured substantially the same as the one-way clutch 320 described above with reference to FIGS. 5A and 5B to enable movement of the working tool 150 within the tool holder 500 only in direction 580. The second one-way clutch 524 is reversed from the first one-way clutch 520, such that the second one-way clutch enables movement of the working tool 150 within the tool holder only in direction 584. The tool holder further includes a torsional spring (not shown) that generates a rotational biasing force between the one-way clutches 520 and 524.

To use the tool holder 500, the user inserts a shank 152 of a working tool 150 into the tool holder 500, through the center of the one-way clutches 520 and 524. In one embodiment, the user rotates the second one-way clutch 524 relative to the first one-way clutch 520 to relieve the rotational biasing force and enable the tool to be inserted into the clutches 520 and 524. After the working tool 150 is inserted into the tool holder 500, the rotational biasing force generated by the spring urges the clutches 520 and 524 in opposite directions with respect to one another, tightening both clutches 520 and 524 to clamp the shank 152 in a fixed position and enabling the tool holder 500 to clamp the shank 152 in the tool holder 500 regardless of the direction of rotation of the rotary power tool. As the rotary power tool is activated in direction 580, the output shaft 540 of the power tool turns, rotating the first and second one-way clutches 520 and 524 in direction 580. In response, the first one-way clutch 520 clamps the shank 152 tightly, in a manner similar to the one-way clutch 320 described above with reference to FIGS. 5A and 5B. When the power tool is activated in direction 584, the second one-way clutch 524 clamps the shank 152 tightly. When the user deactivates the power tool, the user relieves the clamping force of the clutches 520 and 524 by turning the second one-way clutch 524 relative to the first one-way clutch 520 against the rotational biasing force and removes the working tool 150 from the tool holder 500.

Figure 8:
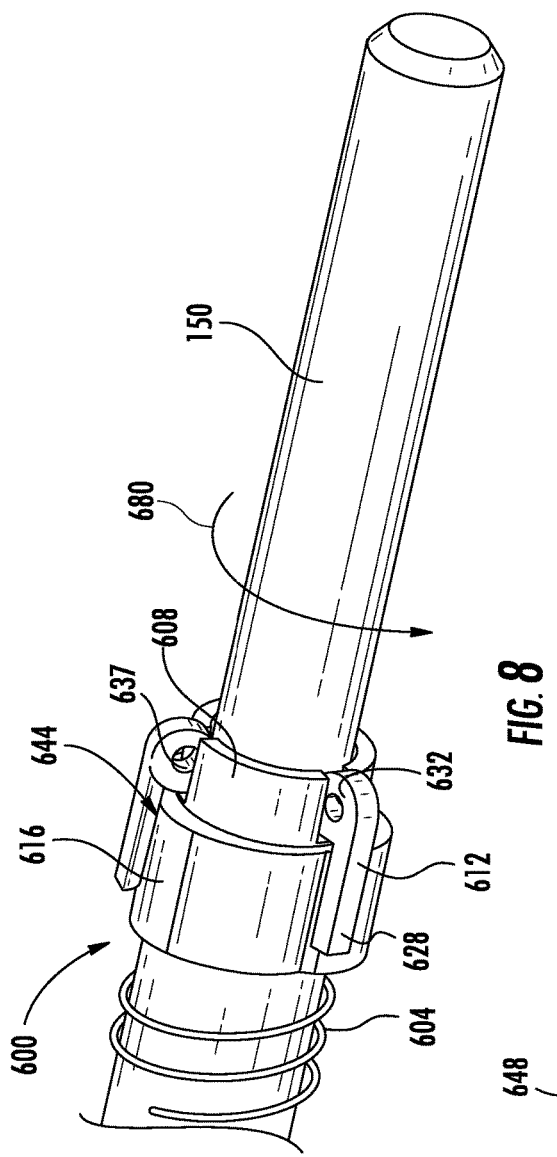
FIG. 8 is a side perspective view of a self-tightening tool holder having a barrel cam.
Figure 9:
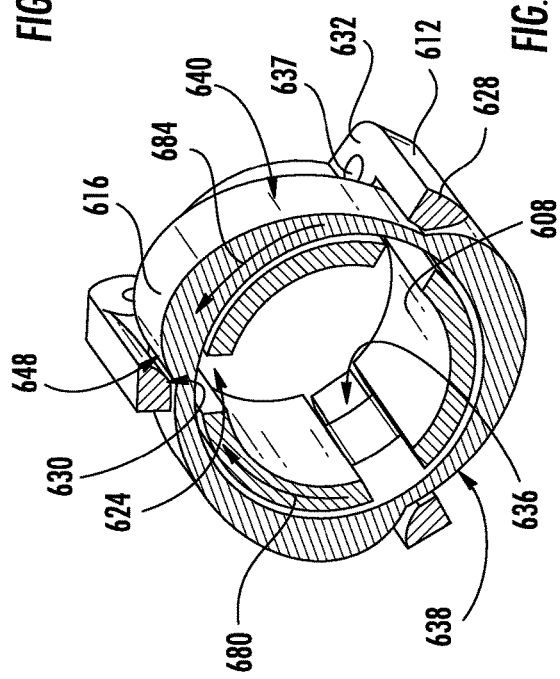
FIG. 9 is a bottom perspective view of the barrel cam of the self-tightening tool holder of FIG. 8.

FIGS. 8 and 9 illustrate yet another self-tightening tool holder 600 for a rotary power tool. The tool holder 600 includes a torsional spring 604, a collar 608, three levers 612, and a barrel cam 616. The torsional spring 604 is interposed between a support (not shown) on the power tool and the barrel cam 616. The collar 608 includes a plurality of slots 624 and is fixedly connected to a motor of the rotary power tool on which the self-tightening tool holder 600 is installed.

The levers 612 are spaced substantially equally around the tool holder 600. In the illustrated embodiment, the tool holder 600 includes three levers 612, though other embodiments include more than three levers. The levers 612 each have a first end region 628 and a second end region 632, which is rounded and includes an inner clamping cam surface 636 and a pivot opening 637, which includes a pivot pin (not shown) fixed to the collar 608. The clamping cam surface 636 has a greater radius from the center of the pivot opening 637 at an axially outer portion. The second end 632 of each lever 612 extends into a corresponding one of the slots 624 in the collar 608. The first end 628 of each lever 612 has a beveled side surface 630 on the clockwise side of the lever 612.

The barrel cam 616 is mounted on the outside of the collar 608 and is configured to rotate with respect to the collar 608. The barrel cam 616 includes an axially inner surface 638 and a radially outer cam surface 640, the front edge of which defines a front edge 644. The outer cam surface 640 has an outer radius that gradually increases in the counterclockwise direction in a region between adjacent levers 612 and has a steep sloped surface 648 immediately opposite to the clockwise end of each of the levers 612.

In operation, the user inserts a working tool 150 through the collar 608. Inserting the working tool 150 forces the rounded cam end 632 of the levers 612 outwardly to enable the working tool 150 to fit through the levers 612 into the collar 608. The torsional spring 604 exerts a torque on the barrel cam 616 in direction 684 due to the engagement of the spring 604 and the lower surface 638 of the barrel cam 616, twisting the barrel cam 616 in direction 684 relative to the collar 608. Since the second ends 632 of the levers 612 are confined in the slots 624 of the collar 608, the levers 612 remain fixed relative to the collar 608. Consequently, the barrel cam 616 rotates with respect to the levers 612 such that the steep sloped surface 648 of the barrel cam outer surface 640 engages the beveled surfaces 630 of the levers 612. Further rotation of the barrel cam 616 results in the steep sloped surface 648 pushing the first ends 628 of the levers 612 radially outwardly, pivoting the levers 612 about the pivot opening 637 the barrel cam 616. The second ends 632 of the levers 612 are pivoted radially inwardly, tightening the clamping cam surface 636 against the working tool 150 as the portion of the clamping cam surface having a greater radius is pivoted into contact with the working tool 150, to hold the working tool 150 in the tool holder 600. The user then activates the rotary power tool to perform work on a workpiece Once the power tool is deactivated, the user twists the barrel cam 616 relative to the collar 608 in direction 680, disengaging the steep sloped surface 648 of the barrel cam outer surface 640 from the beveled surfaces 630 of the levers 612. The first end region 628 of each of the levers 612 moves radially inwardly, pivoting the lever 612 about the pivot opening 637 to move the second end region 632 of the lever 612 radially outwardly as the portion of the cam surface having a lesser radius moves back into contact with the working tool 150, reducing the clamping force exerted on the working tool 150 by the clamping surfaces 636. The user then removes the working tool 150 from the tool holder 600.

Figure 10:
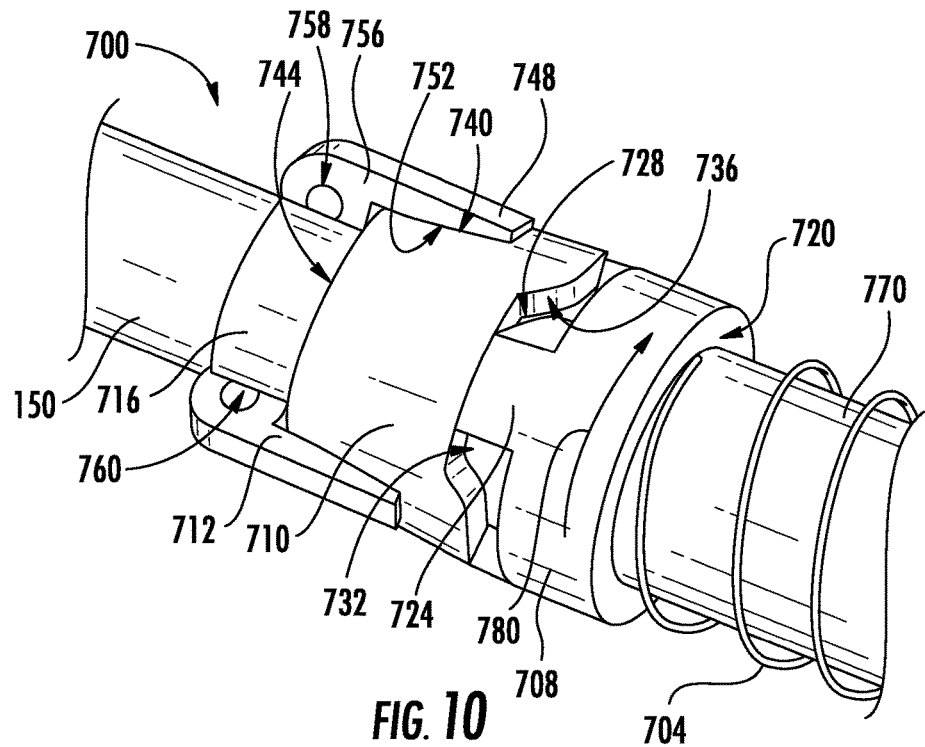
FIG. 10 is a side perspective view of a self-tightening tool holder having a cam collar that moves a wedge cam.

FIG. 10 illustrates another self-tightening tool holder 700 for a rotary power tool. The tool holder 700 includes a torsional spring 704, a cam collar 708, a cam wedge 710, three levers 712 (only two are visible in the view of FIG. 10), and an inner collar 716. The torsional spring 704 is interposed between a support (not shown) on the power tool and the cam collar 708. The cam collar 708 is positioned between the torsional spring 704 and the cam wedge 710. The cam collar 708 has a lower surface 720, which engages the torsional spring 704, and a cam projection 724 extending into contact with the cam wedge 710 and having an angled surface 728. The cam collar 708 partially surrounds an output shaft 770 of the power tool, and is rotationally fixed to the output shaft 770 of the power tool.

The cam wedge 710 is positioned surrounding the inner collar 716 and includes a cam recess 732, in which the cam projection 724 is partially positioned, and an outer frustoconical surface 740. The cam recess 732 has an angled surface 736 that is configured to engage the angled surface 728 of the cam collar 708. The forward edge of the outer surface 740 of the cam wedge 710 defines a forward edge 744.

The levers 712 each have a first end 748 and a second end 756. The first ends 748 each include an inclined lower surface 752 positioned against the outer frustoconical surface 740 of the cam wedge 710 and configured to slide axially against the outer frustoconical surface 740. The second ends 756 are rounded and include an inner clamping cam surface (not shown) and a pivot opening 758, which includes a pivot pin (not shown) fixed to the inner collar 716. The clamping cam surface has a greater radius from the center of the pivot opening 758 at an axially outer portion. The second ends 756 of the levers 712 extend into the inner collar 716 to contact a working tool 150 within the inner collar 716. The inner collar 716 includes three slots 760, in which the second ends 756 of the levers 712 are positioned.

In operation, the user inserts a working tool 150 through center of the inner collar 716. Inserting the working tool 150 forces the rounded second end regions 756 of the levers 712 outwardly to enable the working tool 150 to fit through the levers 712 into the collar 716. The torsional spring 704 exerts a torque on the cam collar 708 in direction 780 due to the engagement of the spring 704 and the lower surface 720 of the cam collar 708, twisting the cam collar 708 in direction 780 relative to the cam wedge 710. The angled surface 728 of the cam collar 708 engages the angled surface 736 of the cam wedge 710 such that the angled surface 736 of the cam wedge 710 slides along the angled surface 728 of the cam collar 708. In response, the cam wedge 710 moves axially with respect to the levers 712 in the direction of the working tool 150. The outer frustoconical surface 740 of the cam wedge 710 slides against the incline surfaces 752 of the levers 712, pushing the first ends 748 of the levers 712 radially outwardly. The levers 712 pivot about the pivot opening 758, forcing the portion of the cam surfaces of the second ends 756 of the levers 712 having a greater radius into contact with the working tool 150 to press against the working tool 150 and clamp the working tool 150 in the tool holder 700.

Once the power tool is deactivated, the user twists the cam wedge 710 in direction 780 to disengage the angled surfaces 728 and 736 from one another. The cam wedge 710 moves in the direction away from the working tool 150, and the first ends 748 of the levers 712 slide along the outer frustoconical surface 740, moving radially inwardly as the first ends 748 slide along the outer surface 740. In response, the levers 712 pivot about the pivot opening 758 to move the second ends 756 of the levers 712 radially outwardly, reducing the clamping force exerted on the working tool 150 by the levers 712. The user then removes the working tool 150 from the tool holder 700.

Figure 11:
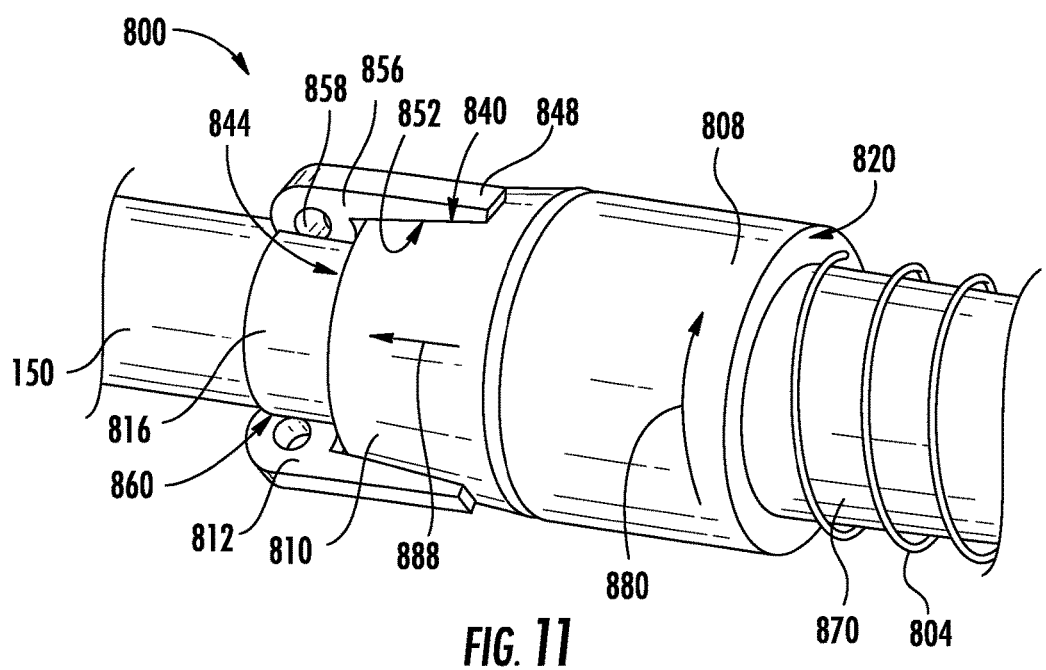
FIG. 11 is a side perspective view of a self-tightening tool holder having a screw bushing that moves a screw wedge.
Figure 11A:
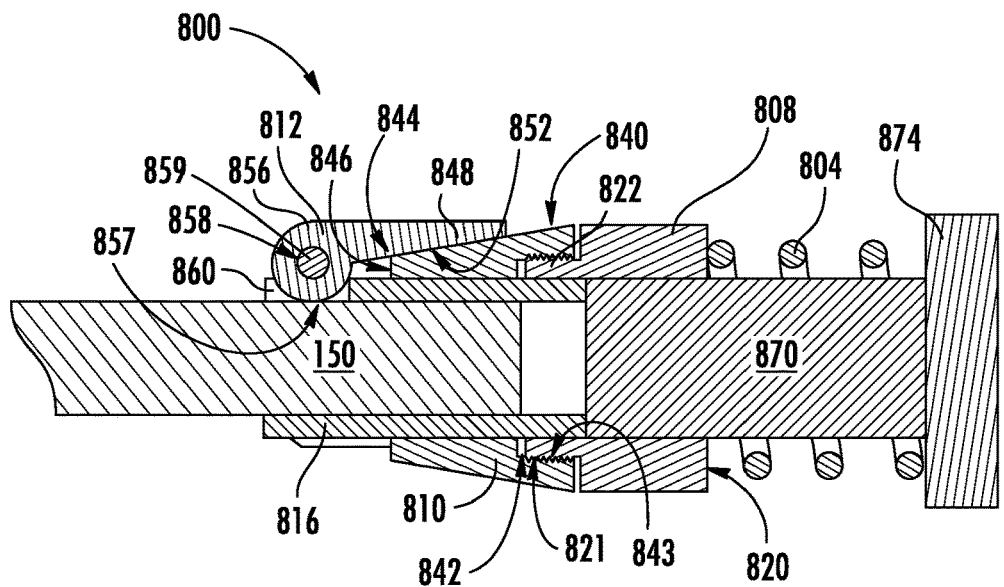
FIG. 11A is a cross-sectional detail view of the screw bushing and screw wedge of the self-tightening tool holder of FIG. 11.

FIGS. 11 and 11A illustrate yet another self-tightening tool holder 800 for a rotary power tool. The tool holder 800 includes a torsional spring 804, a screw bushing 808, a screw wedge 810, three levers 812 (only two are visible in the view of FIG. 11), and an inner collar 816. The torsional spring 804 is interposed between and braced on a support 874 on the power tool and the screw bushing 808. The screw bushing 808 is positioned between the torsional spring 804 and the screw wedge 810. The screw bushing 808 has an end surface 820 engaging the torsional spring 804 and an outer screw thread 821 (FIG. 11A) defined on an projection 822 of the screw bushing 808 that extends into the screw wedge 810. The screw bushing 808 partially surrounds an output shaft 870 of the power tool.

The screw wedge 810 is positioned surrounding the inner collar 816 and has an outer frustoconical surface 840 and a recess 842 having an internal surface with an inner screw thread 843. The recess 842 is configured to accommodate the projection 822 of the screw bushing 808 such that the inner screw thread 842 of the screw wedge 810 complementarily engages the outer screw thread 821 of the screw bushing 808. A forward edge 844 is defined at an intersection of the front end surface 846 of the screw wedge 810 and the outer surface 840.

The levers 812 each have a first end region 848 and a second end region 856. The first end regions 848 each include an inclined lower surface 852 positioned against the outer frustoconical surface 840 of the screw wedge 810 and configured to slide axially along the outer frustoconical surface 840. The second end regions 856 are rounded and include an inner clamping cam surface 857 and a pivot opening 858, which includes a pivot pin 859 fixed to the inner collar 816. The clamping cam surface 857 has a greater radius from the center of the pivot opening 858 at an axially outer portion. The clamping cam surface 857 extends into the inner collar 816 to contact a working tool 150 within the inner collar 816. The inner collar 816 includes three slots 860, in which the second end regions 856 of the levers 812 are positioned.

In operation, the user inserts a working tool 150 through center of the inner collar 816. Inserting the working tool 150 forces the rounded second ends 856 of the levers 812 outwardly to enable the working tool 150 to fit through the levers 812 into the inner collar 816. The torsional spring 804 exerts a torque on the screw bushing 808 in direction 880 due to the engagement of the spring 804 and the lower surface 820 of the screw bushing 808, twisting the screw bushing 808 in direction 880 relative to the screw wedge 810. The outer threads 821 of the screw bushing 808 engage the inner threads 843 of the screw wedge 810 such that rotation of the screw bushing 808 in direction 880 relative to the screw wedge 810 forces the screw wedge 810 in direction 888 toward the working tool 150. The outer frustoconical surface 840 of the screw wedge 810 slides against the incline surfaces 852 of the levers 812, pushing the first end regions 848 of the levers 812 radially outwardly. The levers 812 pivot about the pivot pins 859, which rotates the second end regions 856 of the levers 812 such that the portion of the cam surface 857 having the greater radius presses against the working tool 150 to clamp the working tool 150 in the tool holder 800. The user then activates the power tool to perform work on a workpiece with the working tool 150.

Once the power tool is deactivated, the user twists the screw bushing 808 relative to the screw wedge 810 in a direction opposite direction 880. The screw threads 821, 843 of the screw bushing 808 and screw wedge 810, respectively, move the screw wedge 810 relative to the screw bushing 808 and the levers 812 in a direction opposite direction 888, and the first ends 848 of the levers 812 slide along the outer frustoconical surface 840, moving radially inwardly as the first end regions 848 slide along the outer surface 840. In response, the levers 812 pivot about the pivot pin 859 to reduce the clamping force exerted on the working tool 150 by the clamping surfaces 857 of the levers 812. The user then removes the working tool 150 from the tool holder 800.

Figure 12:
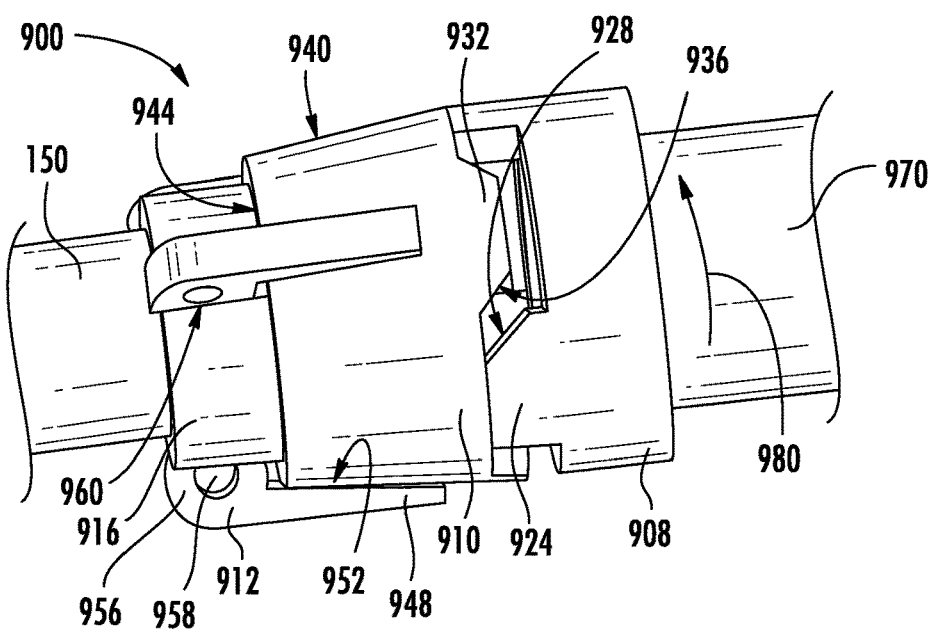
FIG. 12 is a side perspective view of a self-tightening tool holder having a cam collar that moves a wedge cam during operation of an output shaft.

FIG. 12 illustrates another self-tightening tool holder 900 for a rotary power tool. The tool holder 900 includes a cam collar 908, a cam wedge 910, three levers 912, and an inner collar 916. The cam collar 908 partially surrounds an output shaft 970 of the power tool and is rotationally fixed to the output shaft 970 of the power tool. The cam collar 908 includes a cam projection 924, which extends axially to contact the cam wedge 910 and has an angled surface 928.

The cam wedge 910 surrounds a portion of the inner collar 916 and is configured to slide axially with respect to the inner collar 916. The cam wedge 910 includes a cam extension 932 extending toward the cam collar 908, and an outer frustoconical surface 940 having a forward edge that defines a forward edge 944. The cam extension 932 has an angled surface 936 that is configured to engage the angled surface 928 of the cam collar 908.

The levers 912 each have a first end region 948 and a second end region 956. The first end region 948 of each lever 912 has an inclined lower surface 952 positioned against the outer frustoconical surface 940 of the cam wedge 910 configured to slide axially with respect to the cam wedge 910. The second end region 956 of each lever 912 is rounded and includes an inner clamping cam surface (not shown) and a pivot opening 958, in which a pivot pin (not shown) fixed to the inner collar 916 is positioned. The clamping cam surface has a greater radius from the center of the pivot opening 958 at an axially outer portion. The second ends 956 of the levers 912 extend into the inner collar 916 to contact a working tool 150 within the inner collar 916. The inner collar 916 includes three slots 960, each of which accommodates the second end region 956 of one of the levers 912. The cam wedge 910, the levers 912, and the inner collar 916 are all rotationally fixed to each other, and the cam wedge 910, the levers 912, and the inner collar 916 are rotatable relative to the output shaft 970 and the cam collar 908.

In operation, the user inserts a working tool 150 through center of the inner collar 916. Inserting the working tool 150 forces the rounded second end regions 956 of the levers 912 outwardly to enable the working tool 150 to fit through the levers 912 into the collar 916. The user then activates the power tool to rotate the output shaft 970 in direction 980, which also rotates the cam collar 908 in direction 980. The angled surface 928 of the cam collar 908 rotates into engagement with the angled surface 936 of the cam wedge 910 such that the angled surface 936 of the cam wedge 910 slides along the angled surface 928 of the cam collar 908. In response, the cam wedge 910 is forced in the direction of the working tool 150. The outer frustoconical surface 940 of the cam wedge 910 slides against the inclined surfaces 952 of the levers 912, pushing the first end regions 948 of the levers 912 radially outwardly. The levers 912 pivot about the pivot opening 958, which moves the second end regions 956 of the levers 912 such that the portion of the cam surface having a greater radius presses against the working tool 150 to clamp the working tool 150 in the tool holder 900.

The user then presses the working tool 150 into a workpiece to perform work on the workpiece, resulting in the angular velocity of the working tool 150 reducing relative to the output shaft 970 of the power tool. The angular velocity of the levers 912, clamped to the working tool 150, and the connected cam wedge 910 reduce correspondingly with the angular velocity of the working tool 150. The continued rotation of the cam collar 908 at the speed of the output shaft 970 increases the force exerted by the angled surface 928 of the cam collar 908 against the angled surface 936 of the cam wedge 910, resulting in the angled surface 936 slipping against the angled surface 928 to further push the cam wedge 910 in the direction of the working tool 150. The outer frustoconical surface 940 of the cam wedge 910 slides under the levers 912, forcing the first end regions 948 of the levers 912 radially outwardly and pivoting the levers 912 further about the pivot opening 958 to move the portion of the cam surface having a greater radius tighter into the working tool 150. The levers 912 thus exert an increased clamping force that keeps the working tool 150 securely in the tool holder 900 as the rotary power tool is used.

Once the power tool is deactivated, the user twists the cam wedge 910 in direction 980 to disengage the angled surfaces 928 and 936 from one another. In one embodiment, the inertia of the working tool 150, inner collar 916, and cam wedge 910 separates the angled surface 932 from the angled surface 928 as the output shaft 970 and cam collar 908 cease rotating. The cam wedge 910 moves in the direction away from the working tool 150, and the first end regions 948 of the levers 912 slide along the outer frustoconical surface 940, moving radially inwardly as the first end regions 948 slide along the outer surface 940. In response, the levers 912 pivot about the pivot opening 958 to move the clamping cam surface such that the clamping force exerted on the working tool 150 by the levers 912 is reduced. The user then removes the working tool 150 from the tool holder 900.

Figure 13:
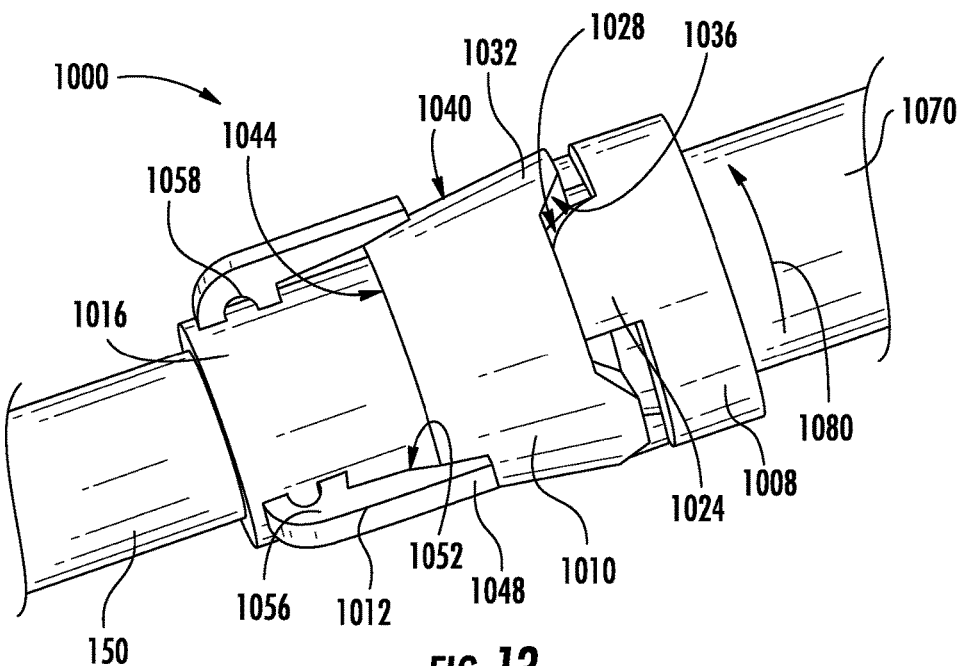
FIG. 13 is a side perspective view of a self-tightening tool holder having a cam collar that moves a wedge cam during operation of an output shaft and levers integral to an inner collar.

FIG. 13 depicts another embodiment of a self-tightening tool holder 1000 for a rotary power tool. The tool holder 1000 includes a cam collar 1008, a cam wedge 1010, three levers 1012, and an inner collar 1016. The cam collar 1008 partially surrounds an output shaft 1070 of the power tool and is fixed to the output shaft 1070 of the power tool. The cam collar 1008 includes a cam projection 1024, which extends axially from the cam collar 1008 to contact the cam wedge 1010 and has an angled surface 1028.

The cam wedge 1010 surrounds a portion of the inner collar 1016 and includes a cam extension 1032 extending axially in the direction of the cam collar 1008, and an outer frustoconical surface 1040, the axially outer edge of which defines a forward edge 1044. The cam extension 1032 has an angled surface 1036 that is configured to engage the angled surface 1028 of the cam collar 1008.

The levers 1012 each have a first end region 1048 and a second end region 1056. The first end region 1048 of each lever 1012 has an inclined lower surface 1052 positioned against the outer frustoconical surface 1040 of the cam wedge 1010 configured to slide axially with respect to the cam wedge 1010. The second end region 1056 of each lever 1012 is fixedly connected to the inner collar 1016. The second end region 1056 of each lever 1012 includes an inner clamping cam surface (not shown) and a pivot opening 1058, in which a pivot pin (not shown) fixed to the inner collar 1016 is positioned. The clamping cam surface has a greater radius from the center of the pivot opening 1058 at an axially outer portion. The second ends 1056 of the levers 1012 extend into the inner collar 1016 to contact a working tool 150 within the inner collar 1016. The cam wedge 1010, the levers 1012, and the inner collar 1016 are all rotationally fixed to each other, and the cam wedge 1010, the levers 1012, and the inner collar 1016 are rotatable relative to the output shaft 1070 and the cam collar 1008.

In operation, the user inserts a working tool 150 through center of the inner collar 1016. The user then activates the power tool to rotate the output shaft 1070 in direction 1080, which also rotates the cam collar 1008 in direction 1080. The angled surface 1028 of the cam collar 1008 rotates into engagement with the angled surface 1036 of the cam wedge 1010 such that the angled surface 1036 of the cam wedge 1010 slides along the angled surface 1028 of the cam collar 1008. In response, the cam wedge 1010 moves axially in the direction of the working tool 150. The outer frustoconical surface 1040 of the cam wedge 1010 slides axially against the inclined surfaces 1052 of the levers 1012, pushing the first end regions 1048 of the levers 1012 radially outwardly. The levers 1012 pivot about the pivot opening 1058, which forces the clamping surfaces of the levers 1012 to move such that the portion having a greater radius moves into contact with the working tool, clamping into the working tool 150 to hold the working tool 150 tightly in the tool holder 1000.

The user then presses the working tool 150 into a workpiece to perform work on the workpiece, resulting in the angular velocity of the working tool 150 reducing with respect to the output shaft 1070 of the power tool. The angular velocity of the levers 1012 and the connected cam wedge 1010 reduce correspondingly with the angular velocity of the working tool 150. The continued rotation of the cam collar 1008 at the speed of the output shaft 1070 increases the force exerted by the angled surface 1028 of the cam collar 1008 against the angled surface 1036 of the cam wedge 1010, resulting in the angled surface 1036 slipping against the angled surface 1028, further pushing the cam wedge 1010 in the direction of the working tool 150. The outer frustoconical surface 1040 of the cam wedge 1010 slides axially against the inclined surfaces 1052 of the levers 1012, forcing the first end regions 1048 of the levers 1012 outwardly, pivoting the levers 1012 further about the pivot opening 1058 to press the clamping surfaces tighter into the collar 1016, and increase the clamping force exerted on the working tool 150 to keep the working tool 150 securely in the tool holder.

Once the power tool is deactivated, the user twists the cam wedge 1010 in direction 1080 to disengage the angled surfaces 1028 and 1036 from one another. In some embodiments, the inertia of the working tool 150, inner collar 1016, and cam wedge 1010 separates the angled surface 1032 of the cam wedge 1010 from the angled surface 1028 of the cam collar 1008 as the output shaft 1070 and cam collar 1008 cease rotating. The cam wedge 1010 moves in the direction away from the working tool 150, and the first end regions 1048 of the levers 1012 slide along the outer frustoconical surface 1044, moving radially inwardly as the first end regions 1048 slide axially along the outer surface 1044. In response, the levers 1012 pivot about the pivot opening 1058 to move the clamping cam surfaces of the levers 1012 such that the clamping force applied to the working tool 150 is decreased. The user then removes the working tool 150 from the tool holder 1000.

Figure 14:
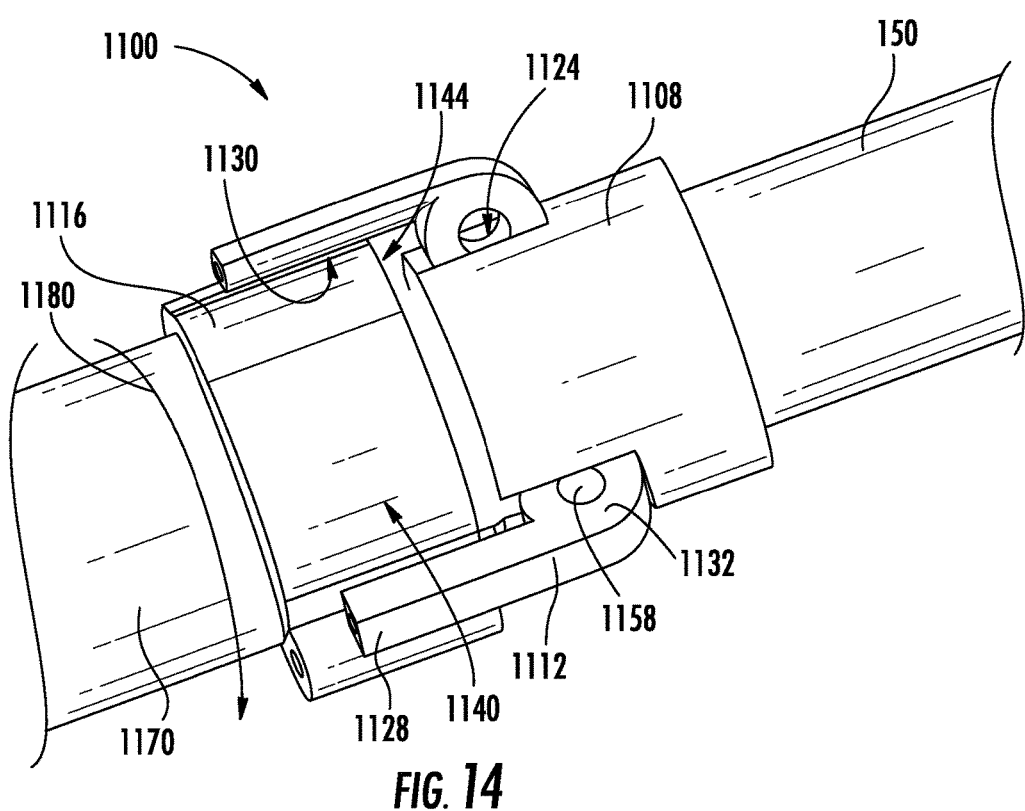
FIG. 14 is a side perspective view of a self-tightening tool holder having a barrel cam that clamps a tool in the tool holder during operation of an output shaft.

FIG. 14 illustrates another self-tightening tool holder 1100 for a rotary power tool. The tool holder 1100 includes a collar 1108, three levers 1112 (only two levers are visible in the view of FIG. 14), and a barrel cam 1116. The collar 1108 has a plurality of slots 1124, and is configured for rotation independent of the barrel cam 1116.

The levers 1112 are spaced substantially equally around the tool holder 1100. The levers 1112 each have a first end 1128 and a second end 1132, which is rounded and includes a clamping surface (not shown) similar to the clamping surface 636 described above with reference to FIG. 9. The second end regions 1132 of the levers 1112 extend into the slots 1124 in the collar 1108 to rotationally couple the levers 1112 and the collar 1108. The second end region 1132 of each lever 1112 is rounded and includes an inner clamping cam surface (not shown) and a pivot opening 1158, in which a pivot pin (not shown) fixed to the inner collar 1116 is positioned. The clamping cam surface has a greater radius from the center of the pivot opening 1158 at an axially outer portion. The second ends 1132 of the levers 1112 extend into the inner collar 1116 to contact a working tool 150 within the inner collar 1116. The first end 1128 of each lever 1112 has an inner surface 1130 that contacts the barrel cam 1116.

The barrel cam 1116 is fixedly mounted to the outside of a motor output shaft 1170. The barrel cam 1116 is configured substantially the same as the barrel cam 616 of the embodiment of FIGS. 8 and 9. The barrel cam 1116 includes an outer cam surface 1140, the front edge of which defines a forward edge 1144. The outer cam surface 1140 has an outer radius that gradually increases in the counterclockwise direction between adjacent levers 1112.

In operation, the user inserts a working tool 150 through the collar 1108. Inserting the working tool 150 forces the rounded end 1132 of the levers 1112 outwardly to enable the working tool 150 to fit through the levers 1112 into the collar 1108. The user then activates the rotary power tool to rotate the output shaft 1170 and the barrel cam 1116 in direction 1180. Since the collar 1108 and levers 1112 are not rotationally fixed to the barrel cam 1116, the barrel cam 1116 rotates in direction 1180 with respect to the levers 1112. In response, the outer surface 1140 of the barrel cam 1116 slides in the clockwise direction under the inner surfaces 1130 of the first end regions 1128 of the levers 1112. The increasing radius of the outer surface 1140 in the counter-clockwise direction results in the first end regions 1128 of the levers 1112 moving radially outwardly. The second end regions 1132 of the levers 1112 pivot about the pivot opening 1158 such that the portion of the clamping surface having a greater radius clamps the second end regions 1132 of the levers 1116 against the working tool 150 and hold the working tool 150 in the tool holder 1100.

As the user presses the working tool 150 against a workpiece to perform work on the workpiece, the rotational velocity in direction 1180 of the tool decreases with respect to the rotational velocity of the output shaft 1170. The barrel cam 1116 moves faster in direction 1180 than the levers 1112, collar 1108, and working tool 150. As the barrel cam 1116 rotates with respect to the levers 1112, the inner surfaces 1130 of the levers 1112 slip against the outer surface 1140 of the barrel cam 1116, moving the barrel cam 1116 in direction 1180 with respect to the levers 1112 and forcing the first end regions 1128 of the levers 1112 further outwardly along the slope of the outer surface 1140 of the barrel cam 1116. The second end regions 1132 of the levers 1112 pivot further about the pivot opening 1058 to clamp the second end regions 1132 of the levers 1116 tighter against the working tool 150.

Once the power tool is deactivated, the user twists the barrel cam 1116 relative to the collar 1108 in a direction opposite direction 1180 to slide the barrel cam outer surface 1140 with respect to the beveled surfaces 1130 of the levers 1112, moving the first end regions 1128 of the levers 1112 radially inwardly. The levers 1112 pivot about the pivot opening 1158 to move the clamping surface of the levers 1112 such that the portion of the clamping surface having a lesser radius contacts the working tool, reducing the clamping force exerted on the working tool 150 by the clamping surfaces 1136. The user then removes the working tool 150 from the tool holder 1100.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A rotary power tool comprising:
    a first collar rotationally fixed with respect to an output shaft of a power tool and including a first shank receiving opening having a longitudinal axis;
    a second collar rotationally movable about the longitudinal axis with respect to the output shaft and including at least one inclined outer surface; and
    at least one lever pivotably connected to the first collar and rotationally movable about the longitudinal axis relative to the second collar, the at least one lever including a first end portion configured to engage the at least one inclined outer surface and a cam located at a second end portion, the cam extending into the first shank receiving opening such that upon rotation of the output shaft in a first rotational direction, the at least one inclined outer surface is forced against the first end portion thereby forcing the cam toward the longitudinal axis.

2. The rotary power tool of claim 1 wherein:
    the at least one lever comprises a plurality of levers;
    the at least one inclined outer surface comprises a plurality of cam regions, each cam region associated with a respective one of the plurality of levers, each of the cam regions extending from a first radial location to a second radial location radially outward from the first radial location.

3. The rotary power tool of claim 2, wherein each of the cam regions has a first outer radius at a first circumferential position and a second outer radius at a second circumferential position, the second outer radius being greater than the first outer radius.

4. The rotary power tool of claim 3, wherein the rotation of the output shaft causes rotation of each of the levers relative to the associated cam regions such that the first end portion of each of the levers moves from engaging the first circumferential position toward the second circumferential position, thereby urging the first end portion radially outwardly and the second end portion toward the longitudinal axis.

5. The rotary power tool of claim 4 wherein:
    each of the plurality of levers includes a beveled side surface in opposition to the associated cam region.

6. The rotary power tool of claim 5 further comprising:
    a biasing member operably connected to the second collar and configured to rotationally bias the second collar such that the cam regions are biased toward the associated opposing beveled side surface.

7. The rotary power tool of claim 6, wherein the biasing member is a torsional spring.

* * * * *